United States Patent
Klinedinst et al.

[19]

[11] Patent Number: 6,064,150
[45] Date of Patent: May 16, 2000

[54] NITRIDE COATED PARTICLE AND COMPOSITION OF MATTER COMPRISED OF SUCH PARTICLES

[75] Inventors: Keith A. Klinedinst, Hudson; Robert F. Clark, Brockton, both of Mass.

[73] Assignee: Osram Sylvania Inc., Danvers, Mass.

[21] Appl. No.: 09/175,787

[22] Filed: Oct. 20, 1998

Related U.S. Application Data

[60] Provisional application No. 60/072,510, Jan. 12, 1998.

[51] Int. Cl.$^7$ ............................................. H01J 1/62
[52] U.S. Cl. ............................................. 313/503; 313/502
[58] Field of Search ........................... 313/502, 503, 313/486; 427/70, 212, 213, 235.2

[56] References Cited

U.S. PATENT DOCUMENTS

| | | | |
|---|---|---|---|
| 4,585,673 | 4/1986 | Sigai | 427/213 |
| 4,825,124 | 4/1989 | Sigai | 313/486 |
| 5,080,928 | 1/1992 | Klinedinst et al. | 427/70 |
| 5,139,825 | 8/1992 | Gordon et al. | 427/225.2 |
| 5,156,885 | 10/1992 | Budd | 427/70 |
| 5,178,911 | 1/1993 | Gordon et al. | 427/255.2 |
| 5,220,243 | 6/1993 | Klinedinst et al. | 313/502 |
| 5,418,062 | 5/1995 | Budd | 428/403 |
| 5,439,705 | 8/1995 | Budd | 427/212 |
| 5,856,009 | 1/1999 | Nishio et al. | 428/404 |

FOREIGN PATENT DOCUMENTS

| | | | |
|---|---|---|---|
| 02113085 | 4/1990 | Japan | C09K 11/08 |
| 05059357 | 3/1993 | Japan | C09K 11/08 |
| 10012376 | 1/1998 | Japan | H05B 33/04 |

OTHER PUBLICATIONS

Study on Surface Treatment of fluorescent powders Takashi Hirate: Reports of Faculty of Eng.; pp. 39–43 (1990).

Chemical Vapor Deposition of AW thin films; Gordon, et al. J. Mater. Res., vol. 7, No. 7, Jul. 1992, pp. 1679–1684.

Atmospheric pressure chemical vapor dep, of AlN thin . . . films Gordon, et al., J. Mater. Res., vol. 6, No. 1, Jan 1991 pp. 5–7.

*Primary Examiner*—Vip Patel
*Assistant Examiner*—Todd Reed Hopper
*Attorney, Agent, or Firm*—William H. McNeill

[57] ABSTRACT

A phosphor particle having thereon a conformal coating of aluminum nitride. By conformal coating is meant a coating that follows the surface contours of the individual particles. The method of making such phosphors comprises the steps of introducing an inert gas into a reaction vessel; charging phosphor particles into the reaction vessel; heating the reaction vessel to a reaction temperature; introducing a nitride coating precursor into the reaction vessel; introducing a coreactant into the reaction vessel; and maintaining the inert gas flow, coreactant flow and precursor supply for a time sufficient to coat the phosphor particles. The nitride coated phosphor particles produced by this method have excellent efficacy ratings and strong luminance values in lamps after 100 hours use in high humidity (i.e.,>95%).

22 Claims, 3 Drawing Sheets

Precursor Transport Rate vs Reciprocal Temperature
(1 lpm Nitrogen Carrier)

NITRIDE COATED PARTICLE AND COMPOSITION OF MATTER COMPRISED OF SUCH PARTICLES

This application claims the benefit of Provisional patent application Ser. No. 60/072,510, filed Jan. 12, 1998.

TECHNICAL FIELD

This invention relates to coated particles and more particularly to particles having a conformal coating thereon. More particularly, this invention relates to phosphors and still more particularly to electroluminescent phosphors having thereon a coating that protects the phosphor from moisture absorption and greatly increases the life and efficacy.

BACKGROUND ART

Coated phosphors are known from U.S. Pat. Nos. 4,585,673; 4,825,124; 5,080,928; 5,118,529; 5,156,885; 5,220,243; 5,244,750; and 5,418,062. It is known from some of the just-mentioned patents that a coating precursor and oxygen can be used to apply a protective coating. See, for example, U.S. Pat. Nos. 5,244,750 and 4,585,673. The coating processes in several of the others of these patents employ chemical vapor deposition to apply a protective coating by hydrolysis. It also has been reported that chemical vapor deposition, at atmospheric pressure, can be used to deposit thin films of aluminum nitride coatings from hexakis (dimethylamido)dialuminum and ammonia precursors upon silicon, vitreous carbon and glass substrates. See, for example, "Atmospheric pressure chemical vapor deposition of aluminum nitride films at 200–250° C.", Gordon, et al., Journal Material Resources, Vol. 6, No. 1, January 1991; and "Chemical vapor deposition of aluminum nitride thin films", Gordon, et al., Journal Material Resources, Vol. 7, No. 7, July 1992. It would be an advance in the art if a coating process could be developed that operated in the absence of water or water vapor. It would be a further advance in the art to increase the efficacy and the life of such coated phosphors. It would be a still further advance in the art to provide a coating and process that did not rely upon oxygen. It would be a still further advance in the art to provide an electroluminescent phosphor with an aluminum nitride coating.

DISCLOSURE OF INVENTION

It is, therefore, an object of the invention to obviate the disadvantages of the prior art.

It is another object of the invention to enhance the operation of coated phosphors.

Yet another object of the invention is the provision of a phosphor coating method that does not employ water or water vapor, or oxygen.

These objects are accomplished, in one aspect of the invention, by the provision of a phosphor particle having thereon a conformal coating of aluminum nitride. By conformal coating is meant a coating that follows the surface contours of the individual particles.

The objects are further accomplished by the provision of a method of making such phosphors which comprises the steps of introducing an inert gas into a reaction vessel; charging phosphor particles into the reaction vessel; heating the reaction vessel to a reaction temperature; introducing a nitride coating precursor into the reaction vessel; introducing a coreactant into the reaction vessel; and maintaining the inert gas flow, coreactant flow and precursor supply for a time sufficient to coat the phosphor particles.

The nitride coated phosphor particles produced by this method had excellent efficacy ratings and strong luminance values in lamps after 100 hours use in high humidity (i.e.,>95%).

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

In a preferred embodiment of the invention the coating reaction was carried out in a gas-fluidized bed reaction vessel that comprised a one inch O.D. (2.54 cm) glass tube with a coarse porosity, fitted glass disk as the gas distributor. The phosphor employed was a Type 723 electroluminescent phosphor (ZnS:Cu) available from Osram Sylvania Inc., Towanda, Pa. and the phosphor was fluidized by the injection of an inert gas such as nitrogen. The nitride coatings (which can contain amounts of hydrogen as well as the aluminum nitride) were formed via the reaction of ammonia with hexakis(dimethylamido)dialuminum ($Al_2(N(CH_3)_2)_6$). The aluminum nitride precursor was obtained from Strem Chemicals, Newburyport, Mass., and contained within a stainless steel bubbler. The bubbler was maintained at 100° C. and the precursor was transported to the reaction vessel by a carrier of purified nitrogen. The precursor-entrained nitrogen was flowed upwards through the fritted glass distributor through lines that were maintained 20 to 30° C. above the temperature of the bubbler. The anhydrous ammonia coreactant, which was obtained from Matheson Chemicals, Gloucester, Mass., was passed through a Unit mass flow controller prior to entering the fluidized bed via a central glass tube having a fritted glass tip. The ammonia was diluted with purified nitrogen prior to entering the bed. Additionally, the nitrogen carrier was purified by passing through a Centorr purifier followed by a Matheson Nanochem gas purifier. The ammonia, also, was passed through a Nanochem purifier.

The gas handling system was constructed from stainless steel tubing and fittings. Glass-to-metal seals were employed between the glass reactor parts and the gas lines.

Four coating runs were made on a well-sealed system. The phosphor weight was 40 grams and the bubbler temperature was 110° C. in each run. The coating temperatures (i.e., the reaction vessel temperature), times and gas flows are shown in Table I.

TABLE I

| Run No. | Temp. (° C.) | Time (hours) | $N_2$ Carrier Flow (sccm) | $NH_3$ Flow (sccm) | $N_2$ Diluent Flow (sccm) |
|---|---|---|---|---|---|
| L2503-12 | 200 | 4.5 | 1000 | 200 | 300 |
| L2503-13 | 150 | 5.0 | 500 | 100 | 150 |
| L2503-14 | 150 | 20.0 | 250 | 200 | 100 |
| L2503-16 | 225 | 12 | 500 | 100 | 150 |

Figure 1:
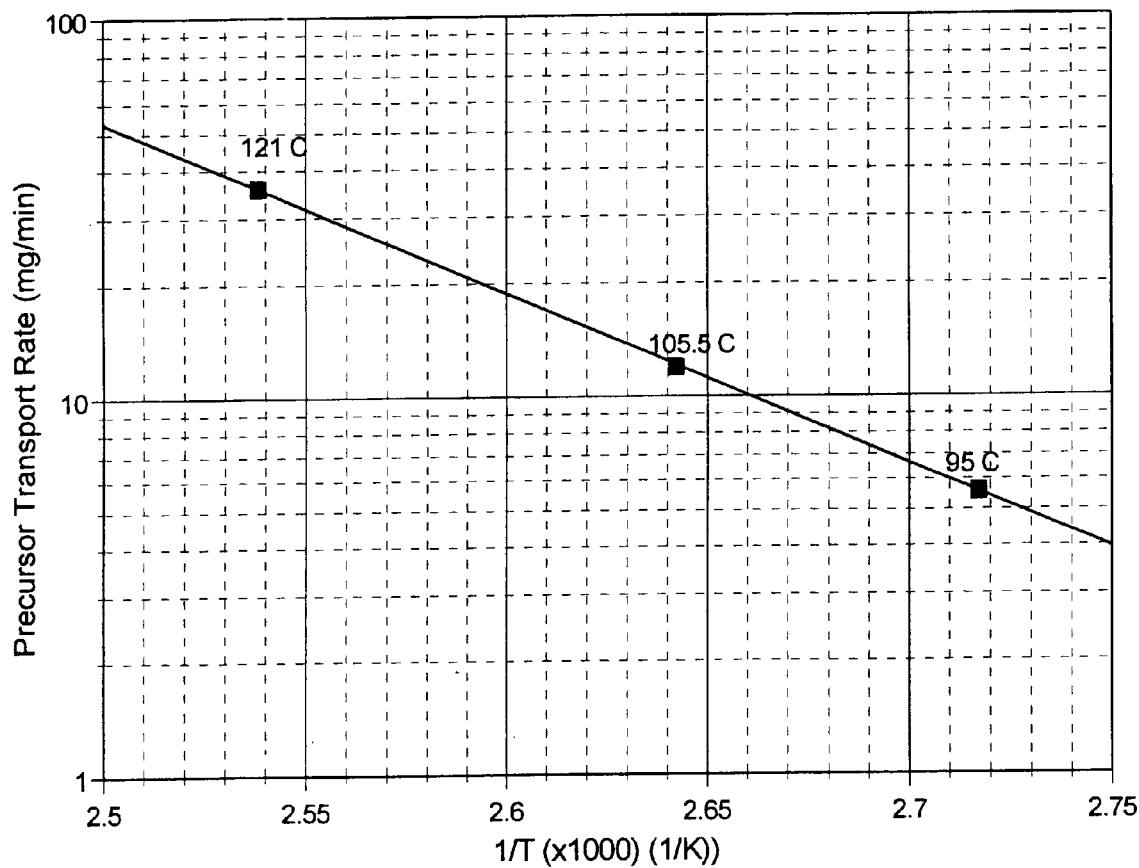
FIG. 1 is a graph of the precursor transport rate vs. reciprocal temperature.
Figure 2:
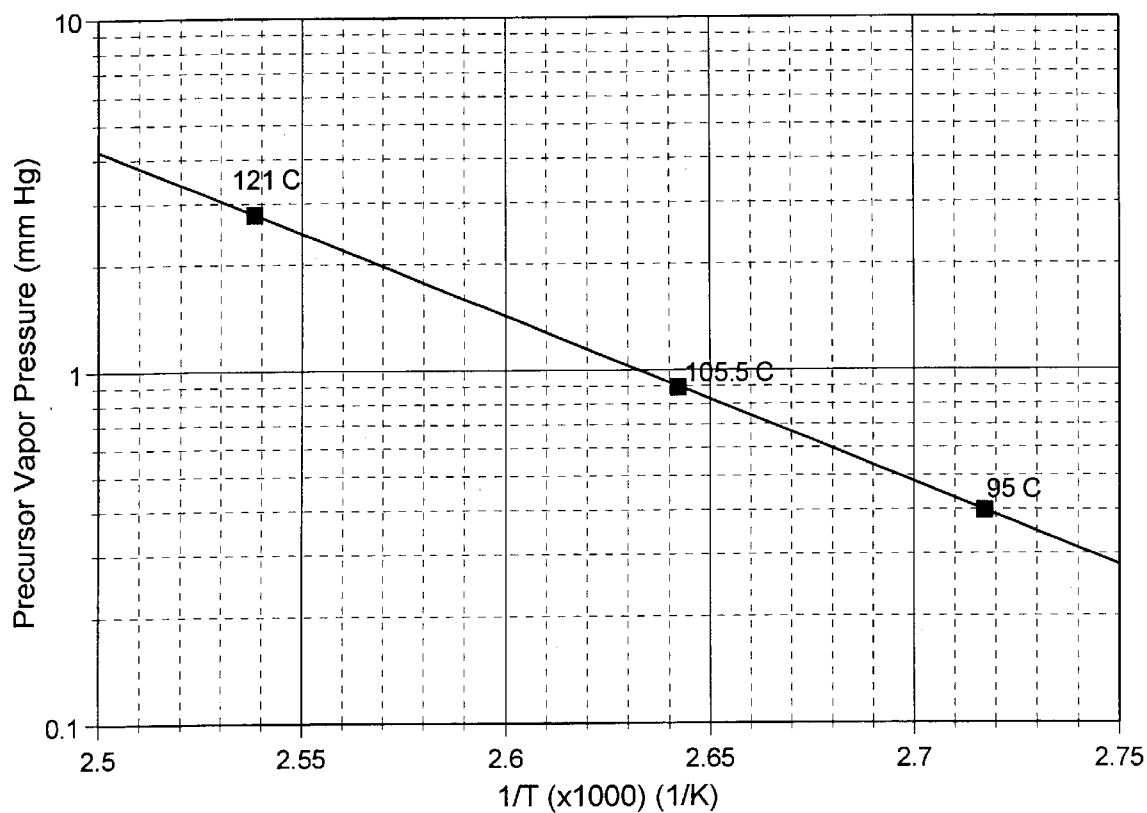
FIG. 2 is a graph of the same data expressed as a vapor pressure curve.
Figure 3:
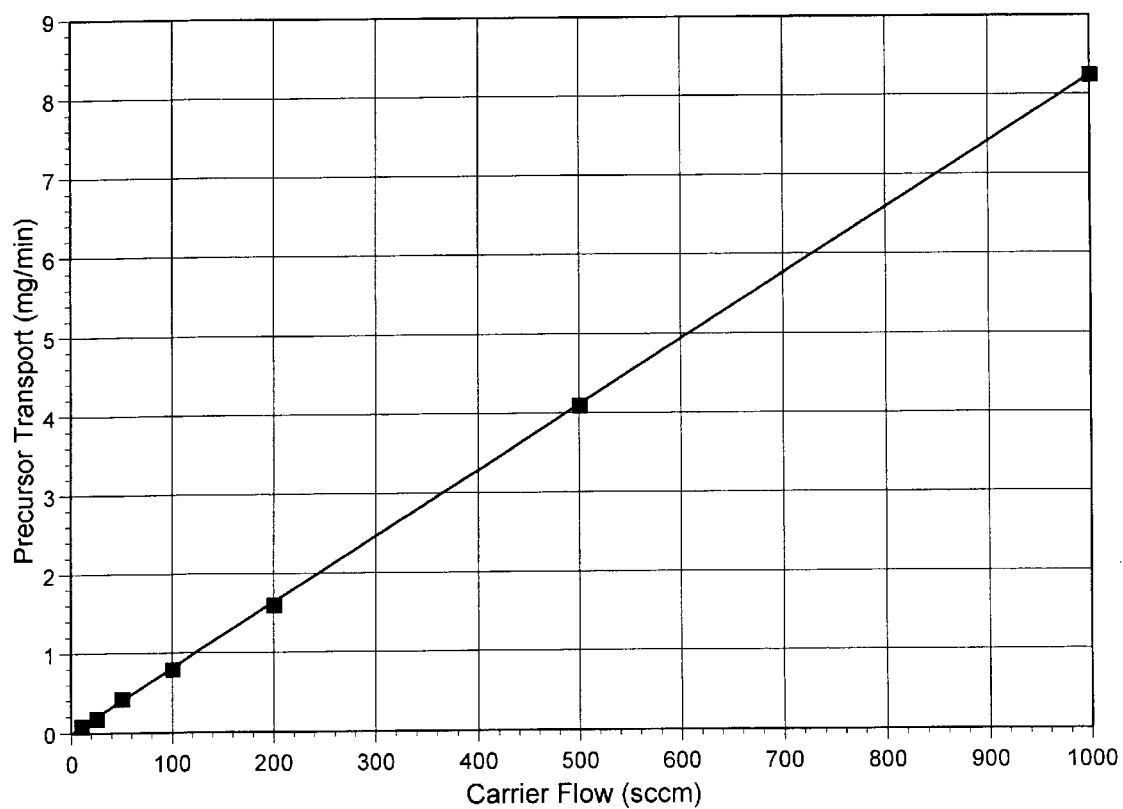
FIG. 3 is a graph of the precursor transport rate vs. the flow rate of the carrier gas.

Prior to the coating runs, the vapor pressure of the nitride precursor was determined at temperatures between 95 and 120° C. via transport measurements using as a carrier gas highly purified nitrogen flowing at 1000 sccm. Then, with a 100° C. bubbler temperature, the transport rate was determined with carrier flows ranging between 10 and 1000 sccm. The results are shown in FIG. 1. FIG. 2 contains the same data expressed as a vapor pressure curve. The transport data obtained as a function of carrier flow with a 100° C. bubbler temperature are shown in FIG. 3. The Figs. illustrate that the vapor pressures are high enough to make the use of a bubbler a practical means of delivering the chemical to the fluidized bed reaction vessel. The linearity of the transport data versus the flow curve, over two orders of magnitude (between 10 and 1000 sccm $N_2$), also indicates the suitability of this mode of precursor delivery.

The aluminum content, expressed as a percentage of total sample weight (% Al), B.E.T. surface area (S.A.($m^2$/gm)), percent coverage (% coverage) from Electron Spectroscopy for Chemical Analysis (ESCA) and approximate coating thickness, from Sputtered Neutral Mass Spectroscopy (SNMS) measurements vs. $SiO_2$ as a reference material, are shown in Table II.

TABLE II

| Run No. | % Al | S.A. ($m^2$/g) | % Coverage | Thickness (Å) |
|---|---|---|---|---|
| L2503-12 | 2.9 | 0.07 | 99 | 2700 |
| L2503-13 | 1.5 | 0.05 | 98 | 800 |
| L2503-14 | 2.5 | 0.06 | 99 | 2200 |
| L2503-16 | 3.3 | 0.05 | 100 | 4300 |

Comparing the data in Tables 1 and 2 and FIG. 1, it will be seen that substantially all of the precursor reacts within the fluidized bed to form a coating which covers practically all of the phosphor particles. X-ray photoelectron spectroscopy (XPS) surface analysis shows a relatively high surface oxygen concentration, a result that is in agreement with the well known surface reactivity of CVD-deposited aluminum nitride. However, SNMS analyses of the coated phosphors has indicated no apparent correlation between the relatively low oxygen signal levels and those of Zn, S, Al, and N, suggesting a relatively constant oxygen background that is not specifically associated with the aluminum nitride coating. Further, as shown in Table III, EDS analyses indicated relative oxygen concentrations comparable to that found in a sample of pure AlN.

TABLE III

| | Atomic Composition From EDS (%) | | | | |
|---|---|---|---|---|---|
| Run No. | Al | N | O | Zn | S |
| L2503-12 | 16 | 71 | 5.1 | 4.3 | 2.6 |
| L2503-14 | 18 | 70 | 3.6 | 4.5 | 3.3 |
| L2503-16 | 20 | 70 | 2.8 | 4.1 | 1.8 |
| Pure AlN | 28 | 67 | 4.8 | — | — |

Electroluminescent lamps were made containing uncoated phosphor as well as coated phosphors from each of the Runs. The lamps were packaged in Mylar, a water-permeable material, so that the moisture sensitivity of the various materials could be determined and compared. Identical lamps were operated at 100V and 400 Hz in two environments; with less than 10% relative humidity and with more than 95% relative humidity. The efficacy (in lumens per watt) was also determined. These results are summarized in Table IV.

TABLE IV

| Run No. | Efficacy (Lumens/W) | Luminance (fL) with <10% R.H. | | | Luminance (fL) with >95% R.H. | | |
|---|---|---|---|---|---|---|---|
| | | 0 hr. | 24 hr. | 100 hr. | 0 hr. | 24 hr. | 100 hr. |
| L2503-12 | 5.26 | 22.6 | 22.0 | 20.0 | 23.0 | 23.6 | 17.6 |
| L2503-13 | 4.23 | 26.0 | 24.9 | 22.0 | 26.2 | 26.4 | 6.1 |
| L2503-14 | 4.26 | 22.6 | 22.1 | 19.4 | 22.4 | 21.9 | 17.5 |
| L2503-16 | 5.90 | 22.8 | 21.7 | 19.5 | 22.9 | 23.5 | 21.9 |
| Uncoated | 1.75 | 29.9 | 31.6 | 24.9 | 30.5 | 10.0 | 3.7 |

The lamp performance data clearly show the advantages of the aluminum nitride coating when properly applied. The comparison with the uncoated phosphor, whose performance falls off drastically in a humid environment after 100 hours, and that of the adequately coated materials, such as L2503-12, L2503-14 and L2503-16, is readily apparent. Even a coated material (L2503-13) without an adequate cover (note from Table II that this latter material has only 98% coverage and a thickness of 800 Å) does not fare well in the harsh environment.

Accordingly, there is here provided an electroluminescent phosphor that has good efficacy, long life and a suitability for use in a humid environment.

While there have been shown and described what are at present considered the preferred embodiments of the invention, it will be apparent to those skilled in the art that various changes and modifications can be made herein without departing from the scope of the invention as defined by the appended claims.

What is claimed is:

1. An electroluminescent phosphor comprised of particles, substantially each of which has thereon a conformal coating of aluminum nitride.

2. An electroluminescent lamp containing a light source resistant to moisture, said light source comprising the electroluminescent phosphor of claim 1.

3. The lamp of claim 2 wherein said lamp has a luminance of greater than 17 fL after 100 hours exposure in a relative humidity of>95%.

4. The lamp of claim 3 wherein the particles of said phosphor have a coating thickness of>2000 Å.

5. In a process of applying a moisture resistant nitride coating to particles of electroluminescent phosphor, the steps comprising: introducing an inert gas into a reaction vessel that is charged with phosphor particles; heating said reaction vessel to a reaction temperature; introducing a nitride coating precursor into said reaction vessel; introducing a coreactant into said reaction vessel; and maintaining said inert gas flow, coreactant flow and precursor supply for a time sufficient to coat said phosphor particles with said moisture resistant nitride.

6. The process of claim 5 wherein said nitride coating precursor is hexakis(dimethylamido)dialuminum and said coating is aluminum nitride.

7. The process of claim 6 wherein said coreactant is anhydrous ammonia.

8. The process of claim 7 wherein said precursor is carried from a supply thereof which is maintained at about 100° C.

9. The process of claim 8 wherein said precursor is carried from said supply to said reaction vessel by purified nitrogen gas through lines maintained at a temperature of from about 130 to about 140° C.

10. The process of claim 9 wherein said anhydrous ammonia is diluted with purified nitrogen prior to entering the reaction vessel.

11. In a process of applying a moisture resistant nitride coating to particles of electroluminescent phosphor, the steps comprising: fluidizing phosphor particles in a reaction vessel with an inert gas; heating said reaction vessel to a reaction temperature; introducing a nitride coating precursor into said reaction vessel; introducing a coreactant into said reaction vessel; and maintaining said inert gas flow, coreactant flow and precursor supply for a time sufficient to coat said phosphor particles with said moisture resistant nitride.

12. An electroluminescent lamp containing therein a coated electroluminescent phosphor having thereon a nitride coating, said lamp having a luminance, after 100 hours of operation in an environment of>95% relative humidity, greater than 4 times that of a similar lamp employing the same phosphor without said nitride coating.

13. An electroluminescent phosphor comprised of particles substantially each of which has thereon a coating produced by the method of claim 7.

14. A electroluminescent phosphor particle having thereon a low temperature nitride coating.

15. A electroluminescent phosphor composition of matter comprised of particles substantially each of which has thereon a low temperature nitride coating.

16. The particle of claim 14 wherein said nitride coating is aluminum nitride.

17. The composition of matter of claim 15 wherein said nitride coating is aluminum nitride.

18. The particle of claim 14 wherein said nitride coating is a metallic nitride.

19. The composition of matter of claim 15 wherein said nitride coating is a metallic nitride.

20. The particle of claim 14 wherein said nitride coating contains hydrogen.

21. The composition of claim 15 wherein said nitride coating contains hydrogen.

22. The electroluminescent phosphor of claim 1 wherein said coating of aluminum nitride contains hydrogen.

\* \* \* \* \*